United States Patent
Abruzzese

(10) Patent No.: US 6,517,027 B1
(45) Date of Patent: Feb. 11, 2003

(54) FLEXIBLE/FIXED SUPPORT FOR ENGINE COWL

(75) Inventor: Francesco Abruzzese, Dollard des Ormeaux (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/006,588

(22) Filed: Dec. 3, 2001

(51) Int. Cl.[7] .............................. B64C 1/14; B64C 1/16
(52) U.S. Cl. ...................... 244/129.4; 244/54; 244/127; 244/131
(58) Field of Search ............................. 244/129.4, 54, 244/55, 56, 127, 131

(56) References Cited

U.S. PATENT DOCUMENTS

| | | | |
|---|---|---|---|
| 696,203 A | * 3/1902 | Manteiga et al. | ............. 56/443 |
| 4,174,609 A | 11/1979 | Legrand et al. | |
| 4,365,775 A | 12/1982 | Glancy | |
| 4,555,078 A | 11/1985 | Grognard | |
| 4,613,099 A | * 9/1986 | Smith et al. | ............. 244/129.4 |
| 4,658,579 A | 4/1987 | Bower et al. | |
| 4,683,717 A | 8/1987 | Naud | |
| 4,697,763 A | 10/1987 | Vermilye | |
| 5,035,379 A | 7/1991 | Hersen et al. | |
| 5,046,689 A | 9/1991 | Shine | |
| 5,157,915 A | 10/1992 | Bart | |
| 5,518,206 A | 5/1996 | Arnold et al. | |
| 5,524,847 A | 6/1996 | Broell et al. | |
| 5,620,154 A | * 4/1997 | Hey | ............................. 244/54 |
| 5,649,417 A | * 7/1997 | Hey | ............................. 244/54 |
| 5,737,914 A | 4/1998 | Porte et al. | |
| 5,860,623 A | * 1/1999 | Dunstan et al. | ............... 244/54 |
| 6,032,901 A | * 3/2000 | Carimali et al. | ......... 244/129.4 |

FOREIGN PATENT DOCUMENTS

SU      580-142      11/1977

* cited by examiner

Primary Examiner—Charles T. Jordan
Assistant Examiner—Stephen A Holzen
(74) Attorney, Agent, or Firm—Ogilvy Renault

(57) ABSTRACT

A support assembly is provided for selectively supporting an aircraft engine cowling on an aircraft, the latch assembly including a cowling support mounted to the cowling, an aircraft support mounted to the aircraft frame; and a latching member. The latching member is moveable between a first position, in which it substantially fixes the cowling support to the aircraft support, and a second position, in which it permits the cowling support to move relative to the aircraft support. The support assembly also variably mounts the engine cowling to the aircraft mount such the support assembly substantially isolates the first support mount from a transfer of cowling weight from the second support mount in an 'open' condition, and permits a transfer of cowling weight from the second support mount to the first support mount in a 'closed' condition.

16 Claims, 5 Drawing Sheets

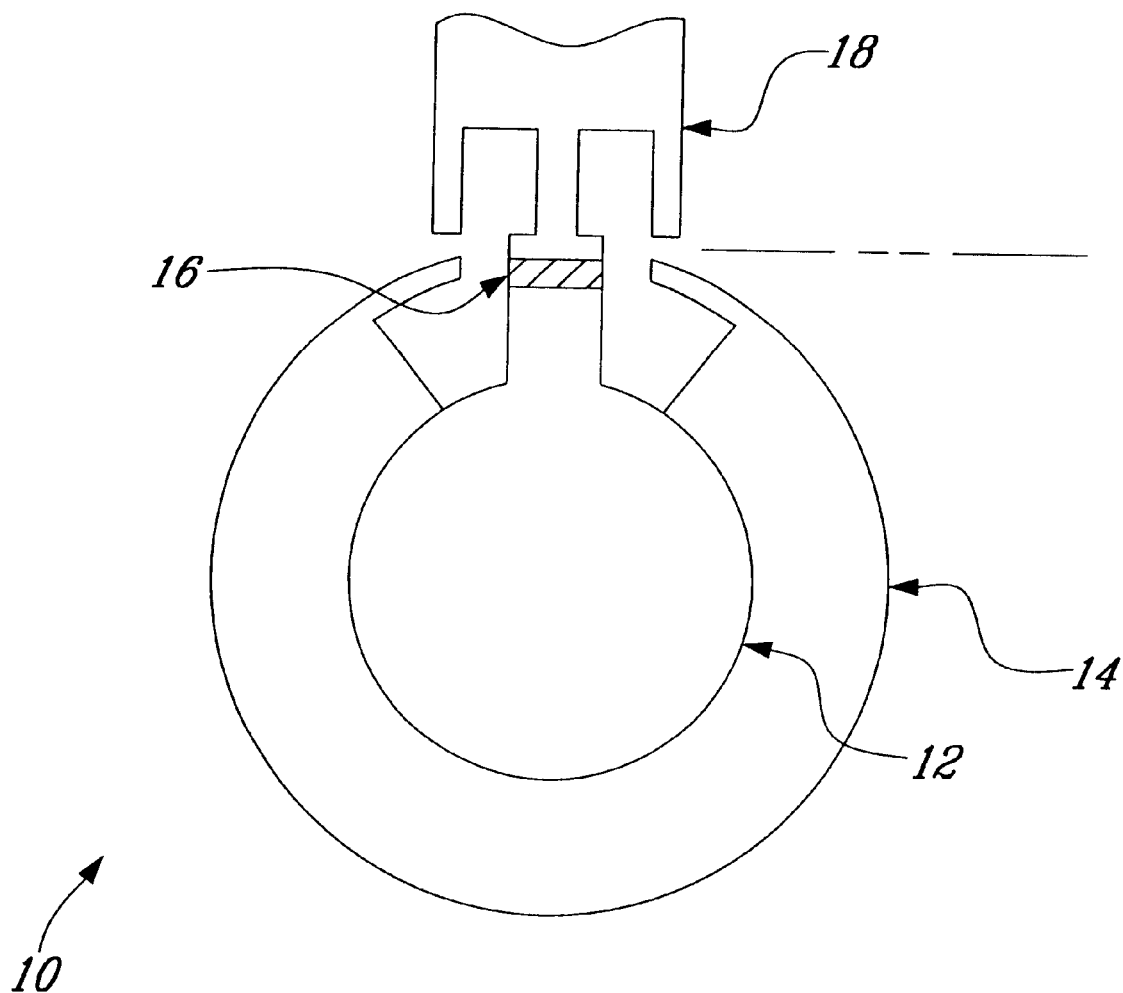
FIG_1  Prior Art

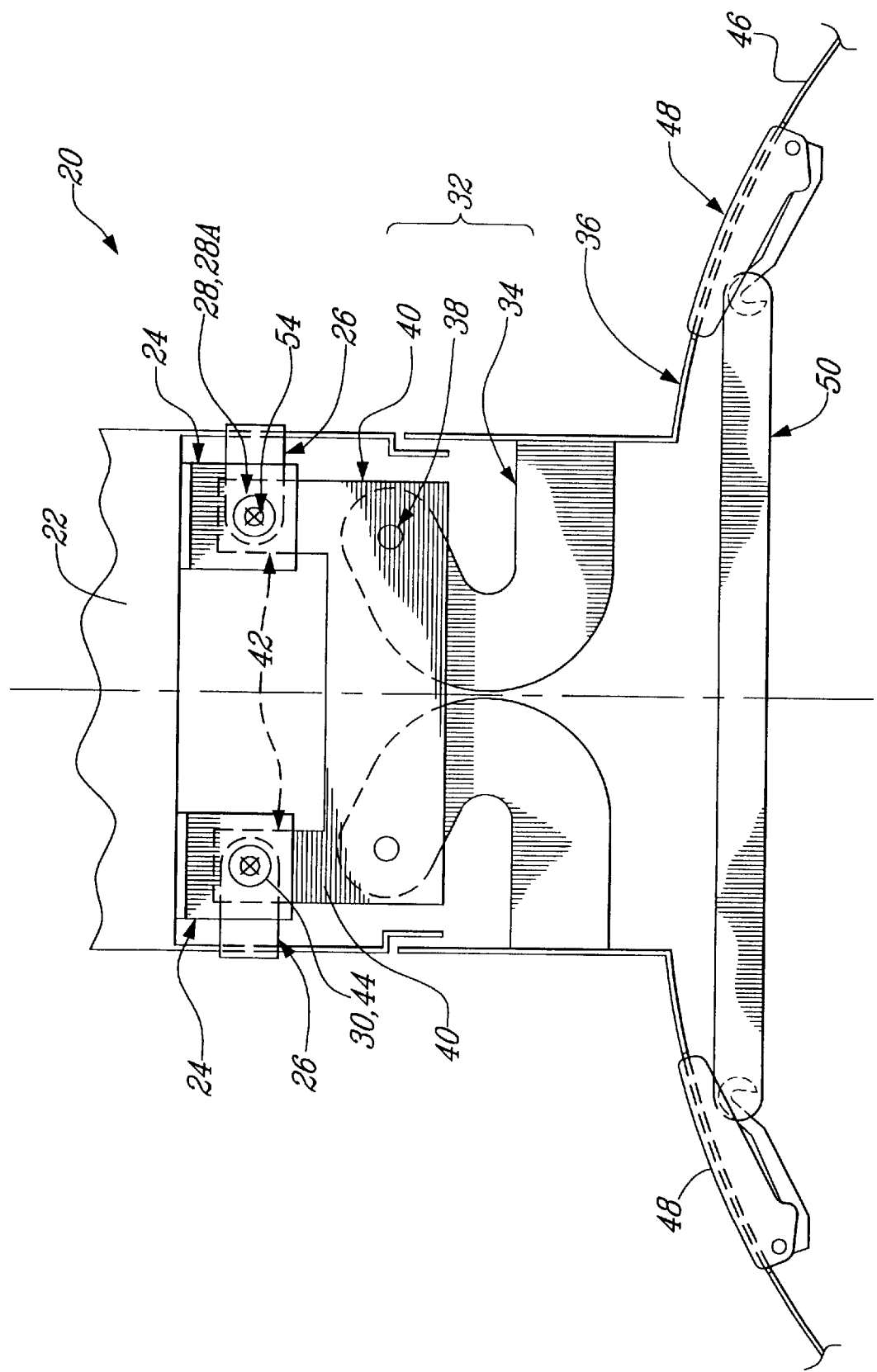

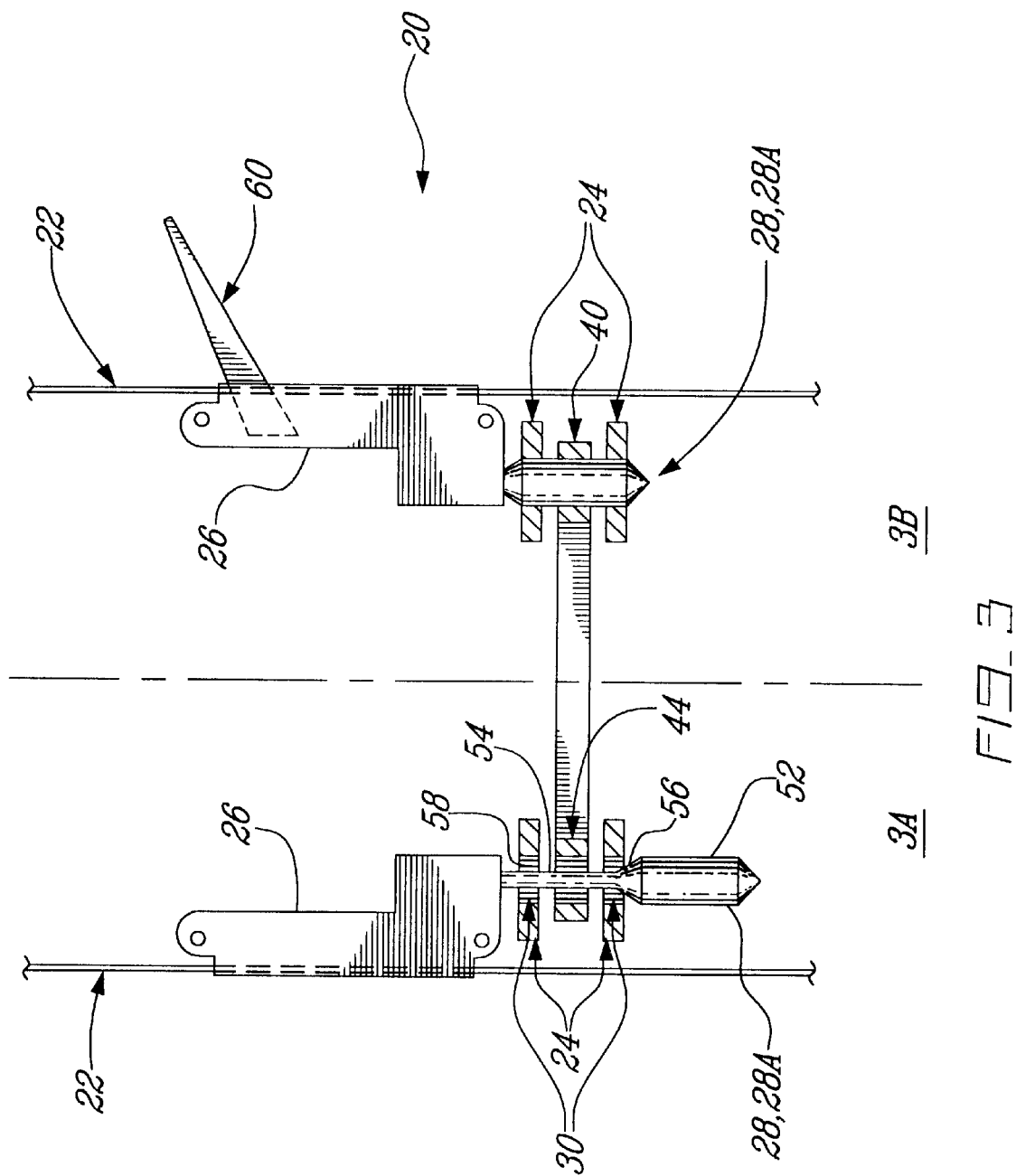

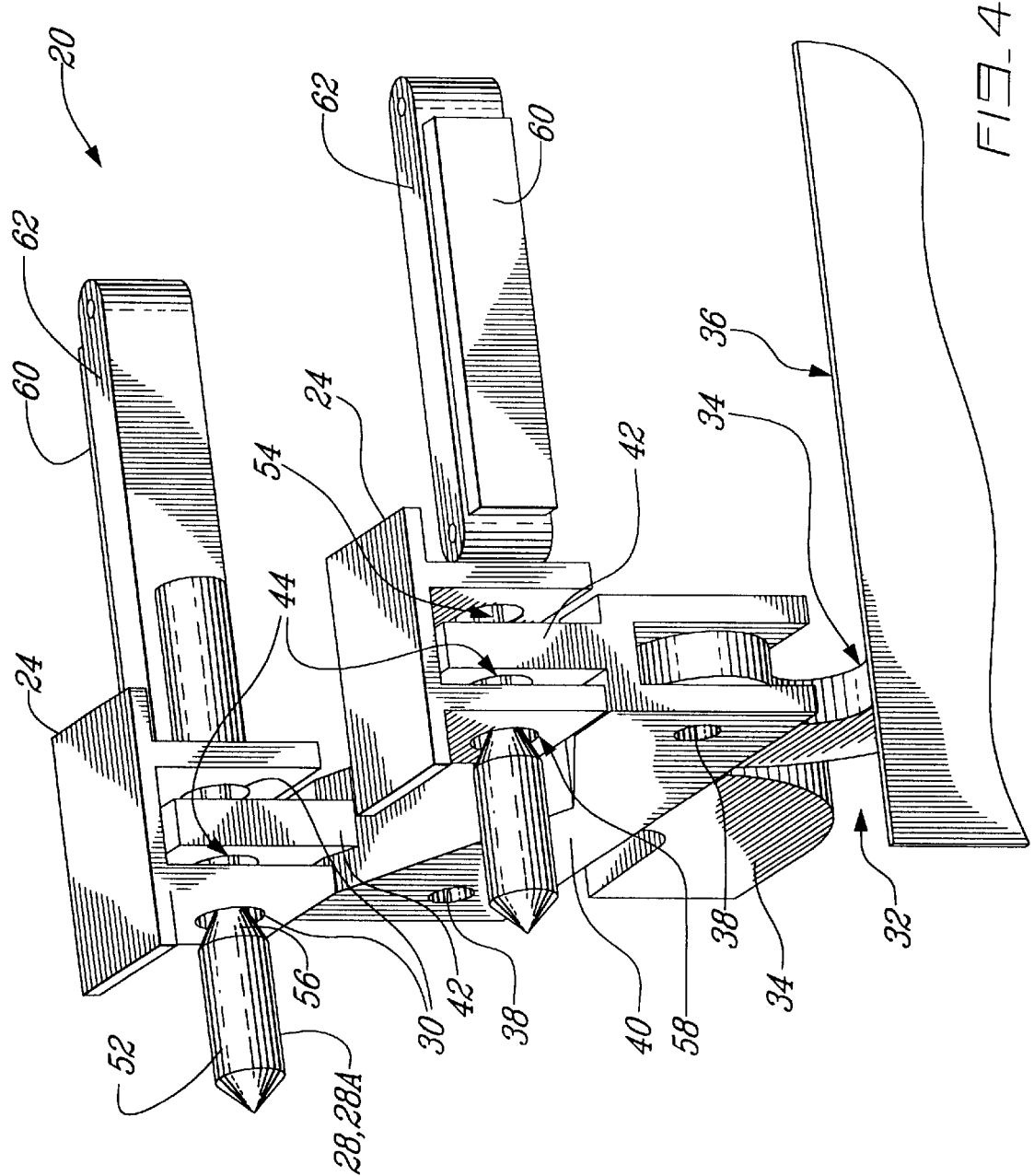

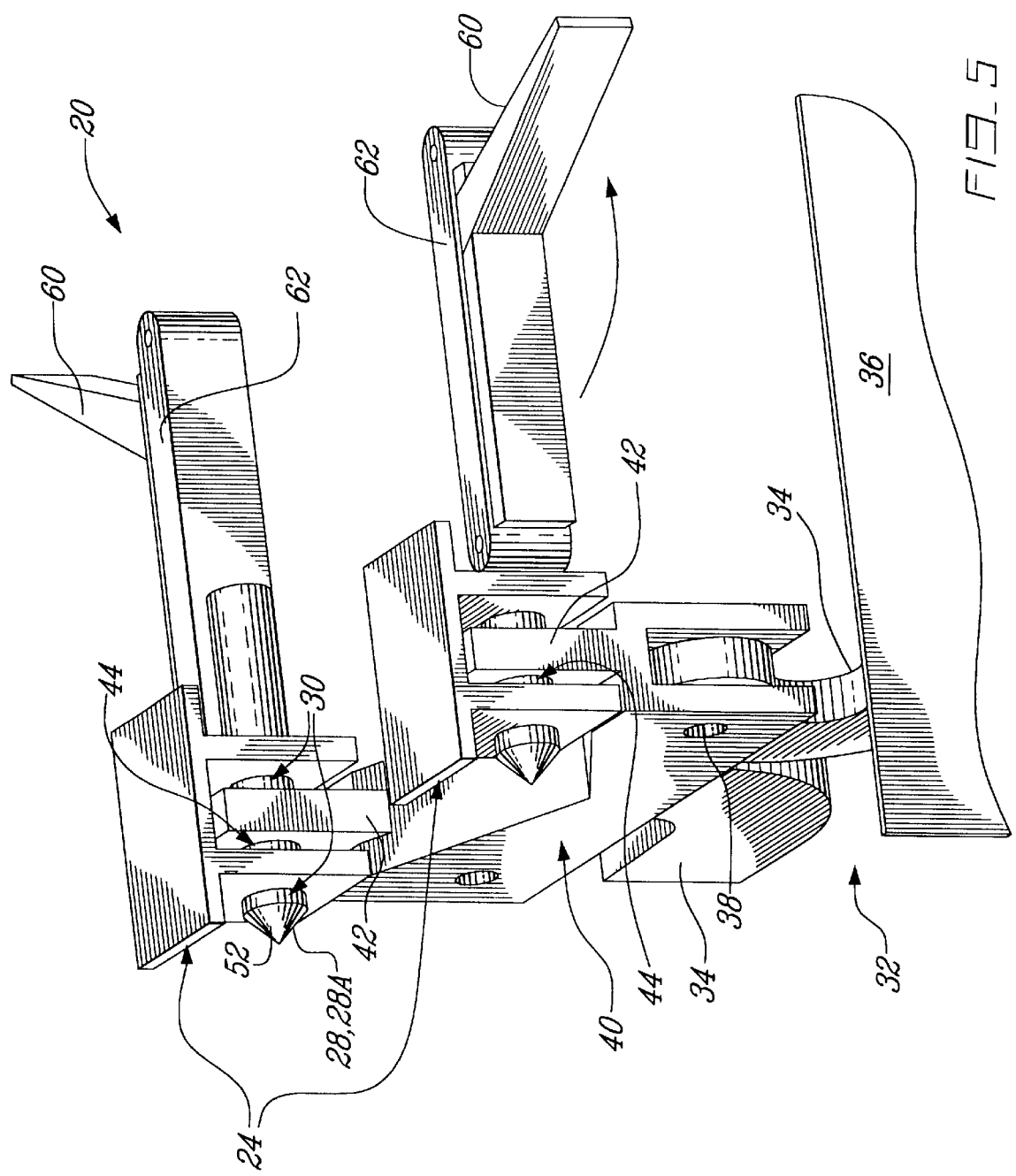

FLEXIBLE/FIXED SUPPORT FOR ENGINE COWL

TECHNICAL FIELD

The present invention relates to aircraft engine cowling supports, and more particularly, to a support structure for a suspended aircraft cowling which is alternately fixedly and flexibly mounted to the aircraft.

BACKGROUND OF THE INVENTION

Aircraft engine cowlings are commonly suspended from the aircraft wing by a flexible mounting system. This permits the cowling to be free to move with the engine during flight. The engine and the cowling are fixed together, but retain relative movement with respect to the mounting pylon. These flexible mounts are utilized in order to isolate engine vibrations from the cabin compartment.

While the aircraft is on the ground, however, a fixed engine cowling mounting is more desirable, in order to transfer cowl hinge loads to the pylon (rather than to the engine) and to maintain alignment between cowl components which mate with corresponding engine components, such as cooling ducts and the engine V-blade.

Therefore, there is a need for an aircraft engine cowling support structure capable of providing both fixed and flexible support and which is easy to operate, offers minimal weight penalty and is cost-effective to build, maintain and operate.

SUMMARY OF THE INVENTION

It is an object of this invention to provide an engine cowling support structure capable of both fixedly and flexibly mounting the cowling to the aircraft.

Therefore, in accordance with one aspect of the present invention, a support assembly is provided for selectively supporting an aircraft engine cowling on an aircraft, the support assembly comprising a cowling support mounted to the cowling, an aircraft support mounted to the aircraft frame, and a latching member moveable relative to the supports, the latching member moveable between a first position, wherein the latching member substantially fixes the cowling support to the aircraft support, and a second position, wherein the latching member permits the cowling support to move relative to the aircraft support.

In accordance with a second aspect of the present invention, a support assembly is provided for variably mounting an engine cowling to an aircraft mount, the support assembly comprising a first support member mounted to the aircraft mount, a second support member mounted to the cowling, and a latching member adapted to variably connect the first and second support members, wherein when the support assembly is placed in a first operational condition the support assembly is adapted to permit a transfer of cowling weight from the second support mount to the first support mount, and wherein when the support assembly is placed in a second operational condition the support assembly is adapted to substantially isolate the first support mount from a transfer of cowling weight from the second support mount.

In a third aspect, the present invention provides a support connection for supporting an engine cowling on an aircraft, the aircraft having a mounting pylon with at least a first hole therethrough, the cowling having a cowling support member having at least a second hole therethrough, the support connection comprising a moveable latching member inserted in the first and second holes, the latching member having a first portion and a second portion, the latching member moveable between a first position, wherein the first portion is positioned in the first and second holes, and a second position wherein the first portion is withdrawn from the first and second holes and the second portion is positioned in the first and second holes, wherein the latching member is in the first position the cowling is substantially fixed to the mounting pylon, and wherein the when the latching member is in the second position the cowling is permitted to move relative to the mounting pylon.

BRIEF DESCRIPTION OF THE DRAWINGS

Further features and advantages of the present invention will become apparent from the following detailed description, taken in combination with the appended drawings in which:

FIG. 1 is a simplified schematic front view of a flexible mounted engine and cowling from the prior art.

FIG. 2 is a schematic front view of the cowling support assembly according to the present invention.

FIG. 3 is a cross-sectional schematic top view of the present invention, with one latching member shown in an 'open' position (designated '3A') and one latching member shown in a 'closed' position (designated '3B').

FIG. 4 is an isometric view of the present invention shown in the 'open' position, in which the cowling is supported by the engine.

FIG. 5 an isometric view of the present invention shown in the 'closed' position, in which the cowling is supported by the pylon.

DETAILED DESCRIPTION OF THE PREFERRED EMBODIMENT

A soft mounted turbine engine assembly 10 of the prior art is illustrated in FIG. 1. Generally, an aircraft engine 12 having a cowling 14 is supported by a prior art flexible mount 16 on a pylon 18, which is suspended from the wing of an aircraft (not shown). The engine and cowling are fixed together but have relative movement with respect to the pylon due to the soft or flexible mount supporting the engine. The flexible mount dampens engine vibrations which would otherwise be passed through the mount to the rest of the aircraft. Increased cabin comfort is achieved through a smoother ride. However, when the cowlings are opened, the cowling hinge loads continue to be transferred through the engine mounts to the aircraft.

Turning to FIGS. 2–5, a support assembly according to the present invention is shown generally at 20. Referring to FIG. 2, a pylon 22 hangs typically from the aircraft wing (not shown). A pair of clevis supports 24 and latch brackets 26 are mounted to the pylon 22. A latching member 28, in this case a pin 28A, is pivotably mounted to each bracket 26 and is adapted to be inserted into holes 30 in a corresponding clevis support 24. A cowling hinge assembly 32 includes a goose neck hinge arm 34 extending from the engine cowling 36 and pivotably mounted (about a pivot 38) to a hinge link 40, which also is mounted to cowling 36. The lug supports 42, which extend from hinge link 40, are adapted to mate with the clevis supports 24 so that holes 44 in lug supports 42 are alignable with the clevis holes 30. The cowlings 36 are supported on the engine by hook latches 48 and link 50 which contribute to providing a continuous structure around the engine. It will be understood that the configuration of cowling doors and their associated closure mechanisms are not strictly part of the present invention.

Referring to FIG. 3, the latching member 28 has a head 52, a reduced diameter neck 54 and a smooth-transition shoulder 56 therebetween. The head 52 is dimensioned and adapted to fit appropriately snugly within the holes 44 and 30 of the lug support 42 and the clevis support 24, respectively. Referring to FIG. 4, the neck 54 is sized relative to holes 30 and 44 to provide a clearance 58 between the latching member 28 and the clevis support 24 and the lug support 42. This clearance permits the lug support 42 to 'float' relative to the clevis support 24 or, in other words, permitting some movement of the lug support 42 (mounted to the cowl) relative to the clevis support 24 (mounted to the pylon). The permitted movement is largely translational in a plane perpendicular to the engine axis (e.g. in FIG. 2, a plane parallel to the page) and preferably corresponds at least to the range of motion experienced between a flexibly-mounted cowling and the pylon during engine operation. The latching member 28 is moveably mounted to the bracket 26 such that latching member 28 may translate relative to the clevis and the lug supports 24 and 42. In this embodiment, the latching member 28 is actuatable by a lever 60 operatively connected to the latching member 28 by a suitable mechanism 62.

In use, the latching member 28 is moveable between "open" and "closed" positions which correspond respectively to the "flexible" and "fixed" mounting conditions. Referring to FIG. 3, the latching member 28 on the '3A' side of the Figure is shown in the open/flexible position (see also FIG. 4), wherein the cowling is supported by the engine, and on the '3B' side of the Figure the latching member 28 is shown in the closed/fixed position (see also FIG. 5), wherein the cowling is supported directly by the pylon. Lever 60 is operated to move the assembly between positions.

When in the open/flexible position (FIGS. '3A' and 4), head 52 is withdrawn from holes 30 and 44, thereby allowing the lug supports 42 (i.e. the cowling 36) to move relative to the clevis support 24 (i.e. the pylon 22). In this condition, the cowling 36 is supported by the engine itself, thereby creating the so-called 'soft mount' for the cowling that is desirable during engine operation to isolate the aircraft from cowling vibration. In this condition, substantially no load is carried the support assembly 20. The neck 54 is sufficiently reduced in size to provide a clearance which permits the cowling to 'float' with the engine without neck 54 significantly contacting or binding on the lug support 42 and/or the clevis support 24.

When in the closed/fixed position (FIGS. '3B' and 5), latching member 28 is moved from the open/flexible position until head 52 is positioned within the holes of the clevis support 24 and the lug support 42, such that a conventional pin-and-clevis connection is formed. In this condition, the connection is capable of transferring the cowling weight directly to the pylon. The cowling(s) may then be unlatched (i.e. detached from the engine) to permit access to the engine (e.g. for maintenance) without fear of dropping the cowlings or losing cowling alignment with the engine (e.g. the alignment of cooling ducts, etc.)

The neck 54 also acts as an alignment member and thus preferably remains inserted through holes 30 and 44 to substantially maintain their alignment while the device is in the open/flexible position. Transition shoulder 56 is also provided to urge holes 30 and 44 back into alignment (if necessary) as latching member 28 is moved from the open/flexible position to the closed/fixed position.

The neck 54 also provides a 'failsafe' feature in that, should the door latches 48 of the cowling 36 be opened while a latching member 28 is still in the open/flexible position (i.e. before the cowling is supported by pylon), the lug supports 42 will not be completely released by support assembly 20, but rather will continue to be retained to the clevis support 24 by neck 54. Thus, relative motion between the supports is constrained (but not prevented) by the neck and the support assembly 20 will nevertheless support the cowling if it is accidentally released before the latch assembly is placed in the closed/fixed position, though cowling alignment with the engine will most likely be lost.

Also provided as a 'failsafe' feature, handle 60 extends outwardly while the device is in the fixed/closed position, thereby providing an obvious visual indication that the support assembly is in the fixed/closed mode.

The cowling support system of the present invention permits the cowling to either be supported by the engine or by the pylon, depending on its condition. When the engine is being operated, the latch assembly is positioned in the open/flexible position to permit the cowling to be supported by the engine. When access to the engine is desired, the latch assembly is positioned in the closed/fixed position to permit the cowling to be supported by the pylon. The invention is relatively simple to manufacture and operate and offers only minimal weight penalty.

The embodiments of the invention described above are intended to be exemplary only. Other embodiments will be readily apparent to those skilled in the art. For example, the positioning of head 52 and neck 54 may be reversed relative to bracket. Other means of actuating latching member 28 may also be substituted, and actuation may be automatically and/or remotely coordinated by a suitable linkage or other means. Latching member 28 need not have a conventional pin shape or configuration and the support assembly does not need to be a pin and clevis arrangement. Two latching mechanisms need not be provided; some other number may be suitable for a given cowling and aircraft configuration. The present invention may also be adapted for use with engines other than wing-mounted engines. Many other modifications will also be evident to those skilled in the art. The scope of the invention is therefore intended to be limited solely by the scope of the appended claims.

I claim:

1. A support assembly for selectively supporting an aircraft engine cowling on an aircraft, the support assembly comprising:

a cowling support mounted to the cowling;

an aircraft support mounted to the aircraft; and a latching member moveable between a first position, wherein the latching member substantially fixes the cowling support to the aircraft support, and a second position, wherein the latching member permits the cowling support to move relative to the aircraft support.

2. The support assembly of claim 1, wherein the latching member is adapted to constrain relative movement between the cowling support and the aircraft support when the latching member is in the second position.

3. The support assembly of claim 1, wherein the latching member is adapted to engage the cowling support and the aircraft support when the latching member is in the first position.

4. The support assembly of claim 3, wherein the latching member is adapted to be inserted into the cowling support and the aircraft support when the latching member is in the first position.

5. The support assembly of claim 4, wherein the latching member is adapted to remain inserted in the cowling support and the aircraft support when the latching member is in the second position.

6. The support assembly of claim 5, wherein the latching member is a pin which includes a head portion and a reduced diameter neck portion.

7. A support assembly for variably mounting an engine cowling to an aircraft mount, the cowling having a weight, the support assembly comprising:

a first support member mounted to the aircraft mount;

a second support member mounted to the cowling; and a latching member adapted to variably connect the first and second support members, wherein when the support assembly is placed in a first operational condition the support assembly is adapted to permit a transfer of cowling weight from the second support mount to the first support mount, and wherein when the support assembly is placed in a second operational condition the support assembly is adapted to substantially isolate the first support mount from a transfer of cowling weight from the second support mount.

8. The support assembly of claim 7 wherein the latching member is adapted to constrain relative motion between the first and second support members when the support assembly is in the second condition.

9. The support assembly of claim 7 wherein the latching member is inserted in the first and second support members when the support assembly is in the second condition.

10. A support connection for supporting an engine cowling on an aircraft, the aircraft having a mounting pylon with at least a first hole therein, the cowling having a cowling support member having at least a second hole therein, the support connection comprising:

a moveable latching member inserted in the first and second holes, the latching member having a first portion and a second portion, the latching member moveable between a first position wherein the first portion is positioned in the first and second holes, and a second position wherein the first portion is withdrawn from the first and second holes and the second portion is positioned in the first and second holes, wherein the latching member is in the first position the cowling is substantially fixed to the mounting pylon, and wherein the when the latching member is in the second position the cowling is permitted to move relative to the mounting pylon.

11. The support connection of claim 10 wherein the latching member second portion is adapted to align the first and second holes as the latching member is moved from the second position to the first position.

12. The support connection of claim 10 wherein the latching member comprises a pin.

13. The support connection of claim 12, wherein the pin is cylindrical, the first and second holes are substantially circular, the first portion of the pin has a first diameter and the second portion of the pin has a second diameter, and wherein the second diameter is smaller than the first diameter.

14. The support connection of claim 10, wherein the relative movement of cowling and the mounting pylon is constrained when the latching member is in the second position.

15. The support connection of claim 10, wherein the relative movement of cowling and the mounting pylon are constrained by the second portion of the latching member.

16. The support connection of claim 10, wherein the second portion of the latching member is isolated form the pylon and the cowling support member when the latching member is in the second position.

* * * * *